United States Patent
Xu et al.

(10) Patent No.: US 12,516,256 B2
(45) Date of Patent: Jan. 6, 2026

(54) SINGLE STAGE RENEWABLE JET PRODUCTION

(71) Applicant: EXXONMOBIL TECHNOLOGY AND ENGINEERING COMPANY, Annandale, NJ (US)

(72) Inventors: Xiaochun Xu, Annandale, NJ (US); Alexander J. Dulin, Haddonfield, NJ (US); Madelyn M. Evans, Annandale, NJ (US); Richard C. Baliban, Annandale, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 198 days.

(21) Appl. No.: 18/214,910

(22) Filed: Jun. 27, 2023

(65) Prior Publication Data
US 2024/0002737 A1    Jan. 4, 2024

Related U.S. Application Data

(60) Provisional application No. 63/356,810, filed on Jun. 29, 2022.

(51) Int. Cl.
*C10G 67/14* (2006.01)
*C10G 3/00* (2006.01)
(Continued)

(52) U.S. Cl.
CPC .............. *C10G 67/14* (2013.01); *C10G 3/50* (2013.01); *C10L 1/08* (2013.01);
(Continued)

(58) Field of Classification Search
None
See application file for complete search history.

(56) References Cited

U.S. PATENT DOCUMENTS

| 5,151,371 A | 9/1992 | Quimby et al. |
| 6,759,438 B2 | 7/2004 | Rainis et al. |
| (Continued) | | |

FOREIGN PATENT DOCUMENTS

| WO | 2020/083994 A1 | 4/2020 |
| WO | 2021/094657 A1 | 5/2021 |
| (Continued) | | |

OTHER PUBLICATIONS

Ch. Baerlocher et al., "Atlas of Zeolite Frameworks" published on behalf of the Structure Commission of the International Zeolite Association, 6th revised edition, 2007, 405 pages.
(Continued)

*Primary Examiner* — Tam M Nguyen
(74) *Attorney, Agent, or Firm* — Shook Hardy & Bacon L.L.P.

(57) ABSTRACT

Systems and methods are provided for production of renewable jet fuel and/or jet fuel blending component fractions using a single stage reaction system. Although only a single separation stage is used, the systems and methods can reduce or minimize the volume of feedstock that is exposed to hydrocracking conditions while still producing a jet boiling range fraction having beneficial cold flow properties.

19 Claims, 2 Drawing Sheets

(51) Int. Cl.
*C10G 69/02* (2006.01)
*C10G 69/10* (2006.01)
*C10L 1/08* (2006.01)

(52) U.S. Cl.
CPC ............ *C10G 2300/1011* (2013.01); *C10G 2300/301* (2013.01); *C10G 2300/304* (2013.01); *C10G 2400/08* (2013.01); *C10L 2200/0469* (2013.01); *C10L 2270/04* (2013.01)

(56) References Cited

U.S. PATENT DOCUMENTS

| | | | |
|---|---|---|---|
| 7,846,323 | B2 | 12/2010 | Abhari et al. |
| 8,193,399 | B2 * | 6/2012 | Gosling ................ C10L 1/04 585/242 |
| 8,304,591 | B2 | 11/2012 | Aulich et al. |
| 8,314,274 | B2 | 11/2012 | Marker et al. |
| 8,431,756 | B2 | 4/2013 | Roberts et al. |
| 8,523,959 | B2 | 9/2013 | O'Rear |
| 8,674,160 | B2 | 3/2014 | Hanks et al. |
| 8,729,330 | B2 | 5/2014 | Hanks et al. |
| 8,742,183 | B2 | 6/2014 | Mccall et al. |
| 9,617,479 | B2 | 4/2017 | Fingland et al. |
| 10,000,712 | B2 | 6/2018 | Novak et al. |
| 10,053,639 | B2 | 8/2018 | Shih et al. |
| 12,139,673 | B2 * | 11/2024 | Andersson ............ C10G 67/02 |
| 2008/0066374 | A1 | 3/2008 | Herskowitz |
| 2009/0301930 | A1 | 12/2009 | Brandvold et al. |
| 2012/0209041 | A1 * | 8/2012 | Hanks ................... C10G 47/36 585/250 |
| 2016/0122664 | A1 | 5/2016 | Thakkar |
| 2021/0371761 | A1 * | 12/2021 | Andersson ............ C10G 65/12 |
| 2022/0364001 | A1 * | 11/2022 | Campani ............... C10G 65/14 |
| 2023/0250348 | A1 * | 8/2023 | Xu ........................ C10G 45/64 585/14 |
| 2023/0357652 | A1 * | 11/2023 | Sala ..................... C10G 45/58 |
| 2023/0416619 | A1 * | 12/2023 | Xu .......................... C10G 3/50 |
| 2025/0084330 | A1 * | 3/2025 | Berkhous .................. C10L 1/04 |
| 2025/0154415 | A1 * | 5/2025 | Bandy, III ............ C10G 45/58 |

FOREIGN PATENT DOCUMENTS

| | | |
|---|---|---|
| WO | 2021/099343 A1 | 5/2021 |
| WO | 2021/180805 A1 | 9/2021 |
| WO | 2021/260158 A1 | 12/2021 |

OTHER PUBLICATIONS

International Search Report and Written Opinion received for PCT Patent Application No. PCT/US2023/026283, mailed on Oct. 9, 2023, 163 pages.

* cited by examiner

SINGLE STAGE RENEWABLE JET PRODUCTION

CROSS-REFERENCE TO RELATED APPLICATIONS

This application claims priority to U.S. Provisional Application 63/356,810, filed Jun. 29, 2023, and entitled "Single Stage Renewable Jet Production."

FIELD OF THE INVENTION

Systems and methods are provided for production of renewable jet fractions using a single stage process.

BACKGROUND OF THE INVENTION

The aviation industry is looking for increasingly sustainable sources of jet fuel to lower the carbon intensity of the fuel consumed during flight. While the aviation industry today contributes 2-3% of global $CO_2$ emissions, this is expected to increase with the anticipated growth of the aviation sector over the next 30 years. There are a number of sustainable aviation fuel pathways that have been approved for use in commercial aviation.

Increased production of sustainable diesel fuel is also of general interest. Some renewable diesel products are already commercially available.

Renewable jet production is typically a multi-step process: either single stage or two stage. In a first step, triglycerides, FAME, FFA are hydrotreated with conventional hydrotreating catalysts under typical hydrotreating conditions to convert fatty acid chains to n-paraffins. The resulting n-paraffins are then exposed to a combination of dewaxing and cracking conditions (either as a single step or a plurality of steps) to form a hydroprocessed effluent. The hydroprocessed effluent is then fractionated to produce naphtha, jet, and diesel boiling range fractions.

Conventional methods for production of renewable jet generally use one of two types of strategies. In one strategy, the goal is to primarily make renewable jet fuel. Under this strategy, both cracking and isomerization are purposely performed on the feedstock, so that the resulting average carbon chain is both isomerized and reduced in chain length. The other type of strategy is to make both jet and diesel during a single process. Under this type of strategy, a fractionation or multi-stage separation is used to separate naphtha, jet, and diesel boiling range fractions from the liquid products. In this type of strategy, cracking is not necessarily performed. However, the cut point for separation between the jet and diesel fractions is set relatively low to avoid difficulties with meeting the freezing point limitations that are often included in the specification for a jet fuel.

The carbon chain length distribution for a renewable jet fraction typically shows that $C_{11}$-$C_{12}$ carbon chains are the most common molecular size in the renewable jet fraction. This is in contrast to a typical conventional jet fuel derived from mineral sources, where the molecular size distribution usually has a peak for $C_{13}$-$C_{14}$ chain lengths.

U.S. Pat. No. 7,846,323 describes a system and method for converting a bio-derived feed to form a jet fuel fraction. The bio-derived feed is hydrotreated along with a hydroisomerized co-feed to form a hydrotreated effluent. The $C_{16+}$ portion of the effluent is then passed into a hydroisomerization reactor. The resulting hydroisomerization effluent is then used as the hydroisomerized co-feed to the hydrotreater. The specification recites a temperature for hydroisomerization of 580° F. to 680° F. (304° C. to 360° C.). However, the only example provided in the specification actually uses a hydroisomerization temperature of 685° F. (363° C.).

International Publication WO 2020/083994 describes a method for production of aviation fuel. In the process flow, a renewable feed is passed into a hydrodeoxygenation reactor along with a co-feed. A fractionator is then used to separate the deoxygenated effluent. A portion of the deoxygenated effluent is passed into a hydroisomerization reactor, another portion is recycled to a hydrocracking reactor. The hydrocracking effluent is then used as the co-feed for the renewable feedstock into the hydrodeoxygenation reactor.

U.S. Pat. No. 8,193,399 describes a system and method for converting a bio-derived feed to form a jet and a diesel fraction. The bio-derived feed is introduced into an initial deoxygenation (hydrotreatment) stage, along with a sufficient amount of a recycled product stream to improve hydrogen solubility, so that low pressure operation can be performed. After deoxygenation, the deoxygenated liquid effluent is exposed to both isomerization and hydrocracking conditions. Both a diesel product and a jet product are the separated from the isomerized and hydrocracked effluent. A portion of one or both of these products is used to provide the recycle stream.

U.S. Pat. No. 8,304,591 is directed to forming renewable fuels from bio-derived sources of fatty acids (such as glycerides) that include carbon chains containing no more than 16 carbon atoms.

U.S. Pat. Nos. 8,314,274 and 8,742,183 describe methods for converting a bio-derived feed to form a jet and a diesel fraction. After hydrotreatment to remove oxygen, the feed is hydroisomerized and hydrocracked. The hydrocracking and hydroisomerization can be performed as a single step if an appropriate catalyst is selected. Otherwise, separate cracking and hydroisomerization steps are performed.

U.S. Pat. No. 8,431,756 describes processing a bio-derived feed that still includes a substantial oxygen content with a dewaxing catalyst in order to deoxygenate and/or isomerize the feed.

U.S. Pat. No. 8,523,959 describes processing a triglyceride-containing feed via partial hydrodeoxygenation and optionally hydroisomerization to form fuels. The resulting fuels include an oxygen content of 0.001 wt % (10 wppm) or more. It is noted that the constraint of retaining oxygen in the final product limits the amount of hydroprocessing that can be performed on the feed, due to the relative ease with which oxygen is removed during any type of hydroprocessing.

U.S. Pat. Nos. 8,674,160 and 10,000,712 describe general hydroprocessing of a wide range of bio-derived feedstocks to form diesel fuels with improved cold flow properties.

U.S. Pat. No. 8,729,330 describes exposing mixtures of a bio-derived feed having substantial oxygen content and a mineral feed to a dewaxing/isomerization catalyst.

U.S. Pat. No. 9,617,479 describes hydrodeoxygenation of a wide range of triglyceride-containing feeds under conditions that preserve oxygen and/or olefin content in the feed during hydrodeoxygenation. This can allow for recovery of increased amounts of propylene versus propane when processing triglycerides. The resulting hydrodeoxygenated product can undergo further hydroprocessing.

U.S. Pat. No. 10,053,639 describes producing both a jet fuel product and a diesel fuel product from a feedstock. The feedstock can optionally include a bio-derived portion.

U.S. Patent Application Publication 2008/0066374 describes processing of bio-derived feeds over catalysts including both a catalytic metal function and an acidic function to form diesel fuels. Several examples of processing of soybean oil are provided.

International Publication WO 2021/099343 describes processing bio-derived feeds containing $C_{12}$ to $C_{24}$ hydrocarbons to form a renewable hydrocarbon composition for use as a jet fuel blending component. The feed is hydrodeoxygenated and hydroisomerized. The resulting hydroprocessed effluent is then typically fractionated to separate heavier (i.e., diesel) boiling range components from a jet boiling range fraction. The hydrocarbon composition is described as having an average carbon number of 14.3 to 15.1. This is apparently achieved by having more than 60 wt % of the hydrocarbon composition correspond to $C_{14}$ to $C_{17}$ hydrocarbons.

U.S. Pat. Nos. 6,759,438 and 5,151,371 describe a technique for performing gas chromatography-atomic emission detection (GC-AED).

SUMMARY OF THE INVENTION

In an aspect, a method for producing a renewable jet boiling range fraction is provided. The method includes contacting a bio-derived feedstock and a hydrocracked, dewaxed co-feed with a hydrotreatment catalyst under effective hydrotreatment conditions to produce a deoxygenated effluent. The deoxygenated effluent can include a deoxygenated liquid fraction. The method further includes separating the deoxygenated liquid fraction to form at least i) a jet boiling range fraction having a T90 distillation point of 230° C. or lower and a freeze point of −40° C. or lower and ii) a second fraction having a final boiling point of 300° C. or higher. The method further includes contacting at least a portion of the second fraction with a hydrocracking catalyst under hydrocracking conditions to produce a hydrocracked effluent. Additionally, the method includes cascading at least a portion of the hydrocracked effluent into a reactor containing a dewaxing catalyst under dewaxing conditions to produce an effluent comprising the hydrocracked, dewaxed co-feed.

In another aspect, a method for producing a renewable jet boiling range fraction is provided. The method includes contacting a bio-derived feedstock and a hydrocracked co-feed with a hydrotreatment catalyst under effective hydrotreatment conditions to produce a deoxygenated effluent. The deoxygenated effluent includes a deoxygenated liquid fraction. The method further includes cascading at least a portion of the deoxygenated liquid fraction into a reactor containing a dewaxing catalyst under dewaxing conditions to produce a dewaxed effluent. The method further includes separating the dewaxed effluent to form at least i) a jet boiling range fraction having a T90 distillation point of 260° C. or lower and a freeze point of −40° C. or lower and ii) a second fraction having a final boiling point of 300° C. or higher. Additionally, the method includes contacting at least a portion of the second fraction with a hydrocracking catalyst under hydrocracking conditions to produce a hydrocracked effluent comprising the hydrocracked co-feed.

In still another aspect, a system for producing a renewable jet boiling range fraction is provided. The system includes a hydrotreatment reactor having at least one hydrotreatment feed inlet, at least one treat gas inlet, and a deoxygenated effluent outlet. The hydrotreatment reactor can include one or more beds of hydrotreating catalyst. The system further includes a dewaxing reactor having a dewaxing feed inlet in fluid communication with the hydrodeoxygenated effluent outlet without intermediate separation, a dewaxed effluent outlet, and one or more beds of dewaxing catalyst. The system further includes a separation stage having a separation inlet in fluid communication with the dewaxed effluent outlet, a gas product outlet, and a plurality of liquid product outlets. The plurality of liquid product outlets can include at least a jet boiling range fraction outlet. Additionally, the system includes a hydrocracking reactor having a hydrocracking feed inlet, a hydrocracked effluent outlet in fluid communication with the at least one hydrotreatment feed inlet, and one or more beds of hydrocracking catalyst, the hydrocracking feed inlet being in fluid communication with one or more outlets of the plurality of liquid product outlets that are different from the jet boiling range fraction outlet.

DETAILED DESCRIPTION OF THE INVENTION

Overview

In various aspects, systems and methods are provided for production of renewable jet fuel and/or jet fuel blending component fractions using a single stage reaction system. Although only a single separation stage is used, the systems and methods can reduce or minimize the volume of feedstock that is exposed to hydrocracking conditions while still producing a jet boiling range fraction having beneficial cold flow properties, such as a freeze point of −40° C. or lower.

Generally, each separation stage that is included in a processing train adds to the complexity and cost for producing a product. In addition to the equipment costs for the various separation devices present in a separation stage, performing a separation on the effluent from a reactor generally involves a reduction in pressure and/or a lowering of the temperature of the effluent. Thus, any portions of an effluent that are further processed after separation stage have to be re-pressurized and/or re-heated to the conditions required for the next reactor. While some of these costs can be mitigated by using heat exchange, a process flow can be substantially simplified if one or more separation stages can be entirely avoided. Thus, being able to produce a renewable jet boiling range fraction using a single stage process can provide a variety of advantages for reducing cost and/or complexity relative to a multi-stage processing configuration.

Conventionally, single stage processes for producing a jet boiling range fraction have involved exposing all of the effluent from the hydrotreating reactor to hydrocracking and/or catalytic dewaxing (i.e., hydroisomerization) conditions in one or more subsequent reactors. In such conventional configurations, because the hydrotreated effluent is cascaded into the hydrocracking and/or dewaxing reactor (i.e., passed into the reactor without performing a separation that modifies the composition of the effluent), the hydrocracking is operated under "sour" conditions. For a renewable feedstock, the "sour" conditions may only correspond to the presence of water and/or oxygen in the reaction environment, as opposed to the more typical contaminants such as sulfur and nitrogen. However, even water and oxygen can be sufficient to reduce the activity of a hydrocracking and/or dewaxing catalyst. In order to compensate for such reduced activity, the temperature of the hydrocracking and/or dewaxing step has to be increased. While this is effective for increasing the amount of hydrocracking and/or dewaxing, such increased temperature is typically accompanied by a loss of selectivity, so that additional "overcracking" or "overconversion" of jet boiling range boiling range compounds will occur, leading to a decrease in jet boiling range yield and a corresponding increase in production of naphtha and/or light ends.

In various aspects, the difficulties with conventional single stage reaction systems for renewable jet production can be reduced or minimized by using an alternative single stage configuration. In these alternative single stage configurations, a sweet hydrocracking stage is included in the reaction system. However, depending on the aspect, either a portion of the jet boiling range product corresponds to either components that are not exposed to hydrocracking or dewaxing conditions, or a portion of the jet boiling range product corresponds to components that are exposed to dewaxing under sour conditions without being exposed to hydrocracking.

In some aspects, a renewable feedstock can be exposed to hydrotreating (and/or hydrodeoxygenation) conditions in a first reactor, followed by passing the hydrotreated effluent into a separation stage. The separation stage can form a jet boiling range fraction, one or more lower boiling fractions (such as a naphtha fraction or light ends fraction), and a heavier fraction. The heavier fraction can then be exposed to hydrocracking conditions. Because a separation has been performed, the hydrocracking can be performed under sweet conditions, such as in the presence of a noble metal hydrocracking catalyst. The resulting hydrocracking effluent can then be cascaded into catalyst beds and/or a reactor for exposure to dewaxing or hydroisomerization conditions. The hydrocracked, dewaxed effluent then be passed into the hydrotreatment stage as a co-feed for the renewable feedstock.

In this type of aspect, it is noted that the jet boiling range fraction from the separation stage may contain a substantial portion of non-hydrocracked, non-dewaxed components. As a result, the jet boiling range fraction can have a relatively low T90 distillation point and/or final boiling point. This can allow substantial portions of non-dewaxed paraffins to be included in the jet boiling range product while still achieving one or more target cold flow properties.

In other aspects, a renewable feedstock can be exposed to hydrotreating (and/or hydrodeoxygenation) conditions in a first reactor. The hydrotreated effluent can then be cascaded into a dewaxing or hydroisomerization reactor for dewaxing of a feed under "sour" conditions. Although "sour" dewaxing conditions traditionally refer to performing dewaxing in the presence of sulfur, in this instance the "sour" dewaxing conditions correspond to conditions where excess oxygen and/or water is present in the reaction environment. In aspects where dewaxing is performed under sour dewaxing conditions, the dewaxing conditions can include the presence of 0.5 vol % or more of water in the dewaxing reaction environment, or 1.0 vol % or more, or 2.0 vol % or more, such as up to 5.0 vol % or possibly still more. Thus, a dewaxing or hydroisomerization catalyst that is tolerant of the presence of oxygen and/or water can be used in the dewaxing reactor.

The dewaxed effluent is then passed into a separation stage. The separation stage can form a jet boiling range fraction, one or more lower boiling fractions (such as a naphtha fraction or light ends fraction), and a heavier fraction. The heavier fraction can then be exposed to hydrocracking conditions. Because a separation has been performed, the hydrocracking can be performed under sweet conditions, such as in the presence of a noble metal hydrocracking catalyst. The resulting hydrocracked effluent can then be cascaded into the hydrotreatment reactor as a co-feed for the renewable feedstock. In this type of single stage configuration, at least a portion of the $C_{16+}$ components in the feedstock are exposed to dewaxing conditions prior to the separation stage. This can increase the yield of the jet boiling range fraction from the single stage reaction system while still allowing the jet boiling range fraction to satisfy target cold flow properties.

Definitions

The "cloud point" of an oil is the temperature below which paraffin wax or other solid substances begin to crystallize or separate from the solution, imparting a cloudy appearance to the oil when the oil is chilled under prescribed conditions. Cloud point can be determined according to ASTM D7346.

The "freeze point" of a fraction (such as a feed or product) can be determined according to ASTM D5972. The "flash point" of a fraction can be determined according to ASTM D6450.

Unless otherwise specified, the "Liquid Hourly Space Velocity (LHSV)" for a feed or portion of a feed to a reactor is defined as the volume of feed per hour relative to the volume of catalyst in the reactor. In some specific instances, a liquid hourly space velocity may be specified relative to a specific catalyst within a reactor that contains multiple catalyst beds.

As used herein, the term "renewable diesel" refers to a hydrocarbon product produced from bio-derived feedstocks. Similarly, "renewable jet" refers to a hydrocarbon product produced from bio-derived feedstocks. Examples of typical feedstocks for renewable diesel production include diglycerides, monoglycerides, triglycerides, fatty acid methyl esters (FAME), free fatty acids, and the like, which are often derived from plant oils, animal fats, or algae oils. Relatedly, the term "bio-diesel" generally refers to fatty acid alkyl esters, such as FAME.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

In this discussion, "Tx" refers to the temperature at which a weight fraction "x" of a sample can be boiled or distilled. For example, if 40 wt % of a sample has a boiling point of 350° F. or less, the sample can be described as having a T40 distillation point of 350° F. In this discussion, boiling points can be determined by a convenient method based on the boiling range of the sample. This can correspond to ASTM D86. In the event that ASTM D86 cannot be performed on a sample due to the nature of the sample, ASTM D2887 may be used instead.

In various aspects of the invention, reference may be made to one or more types of fractions generated during distillation of a feedstock, intermediate product, and/or final product. Such fractions may include naphtha fractions and distillate fuel fractions. Each of these fractions can be defined based on a boiling range, such as a boiling range that includes at least 80 wt % of the fraction, or at least 90 wt % of the fraction. For example, for naphtha fractions, at least 80 wt % of the fraction, or at least 90 wt % of the fraction, can have a boiling point in the range of 85° F. (29° C.) to 300° F. (149° C.). It is noted that 29° C. roughly corresponds to the boiling point of isopentane, a C5 hydrocarbon. Fractions boiling below the naphtha range can sometimes be referred to as light ends. For a jet boiling range fraction 80 wt % or more of the fraction, or 90 wt % or more, can have a boiling point in the range of 149° C. to 300° C.

Another option for specifying various types of boiling ranges can be based on a combination of T5 (or T10) and T95 (or T90) distillation points. For example, in some embodiments, having at least 80 wt % (or at least 90 wt %) of a fraction boil in the naphtha boiling range can correspond to having a T10 distillation point (or T5 distillation point) of 29° C. or more and a T90 distillation point (or T95 distillation point) of 149° C. or less. For a jet boiling range fraction, the T10 distillation point can be between 149° C. and 205° C., while the T90 distillation point can be 300° C. or less. In some aspects, a jet boiling range fraction can also have a final boiling point (as measured by ASTM D86) of 300° C. or less.

In this discussion, reference may be made to gas or vapor portions of an effluent or product versus liquid portions of an effluent or product. In this discussion, a gas product portion or gas effluent portion refers to an effluent portion or product portion that would be in the gas phase at 20° C. and 100 kPa-a. Similarly, a liquid product portion or liquid effluent portion refers to an effluent portion or product portion that would be in the liquid phase at 20° C. and 100 kPa-a. In this discussion, when describing the current state of an effluent portion or product portion (such as the state of a portion or fraction under the conditions present at the exit from a reaction stage), the effluent portion or product portion is described as being in the gas phase or as being in the liquid phase. For example, due to the elevated temperature and pressure in a hydroprocessing stage (such as a hydrotreating stage or a dewaxing stage), the liquid effluent portion of the hydroprocessing effluent may be present partially or entirely in the gas phase.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

In this discussion, if it is necessary to determine the oxygen content of a sample, the oxygen content can be determined using gas chromatography—atomic emission detection (GC-AED). The basic GC-AED method starts by passing a sample for analysis, such as a deoxygenated jet boiling range fraction, through a gas chromatography system to separate the components of the sample. The resulting separation stream from the gas chromatograph can then be passed into an atomic emission spectrometer with plasma-excitation capability, along with an inert (carrier) gas and a carbon-containing gas (such as methane). A plasma is then formed from the mixture, followed by detection of oxygen in the plasma. Examples of this method are described in U.S. Pat. Nos. 6,759,438 and 5,151,371, which are incorporated by reference herein for the limited purpose of describing the GC-AED analytical technique. A standard spectrometer for GC-AED may be used to monitor oxygen concentration.

Configuration Examples

Figure 1:
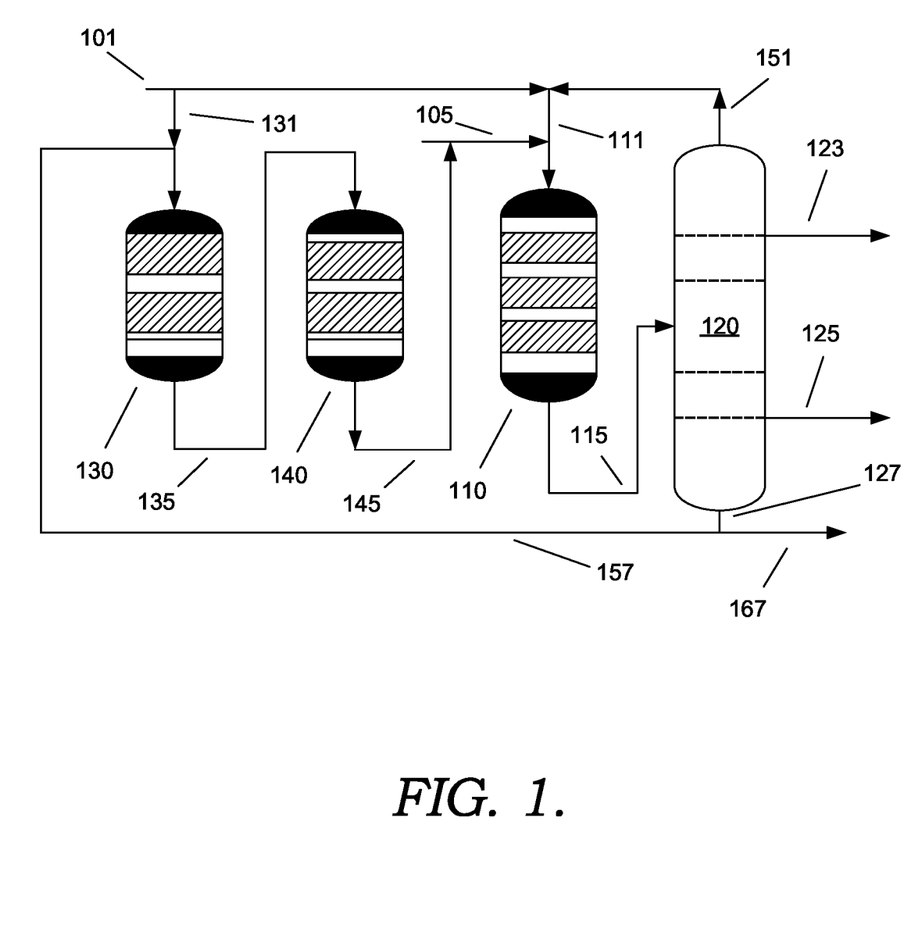
FIG. 1 shows an example of a reaction system for producing a renewable jet boiling range fraction.

FIG. 1 shows an example of a single stage reaction system for producing a renewable jet boiling range product. As shown in FIG. 1, a bio-derived feedstock 105 is introduced into a hydrotreatment reactor 110. A hydrogen-rich treat gas stream 111 is also introduced into the hydrotreatment reactor 110. In the example shown in FIG. 1, hydrogen-rich treat gas stream 111 corresponds to a combination of recycled hydrogen 151 and make-up hydrogen 101. In other aspects, fresh or make-up hydrogen can be used to supply all of hydrogen-rich treat gas stream 111, or recycled hydrogen can be used to supply all of hydrogen-rich treat gas stream 111. It will be appreciated by one of skill in the art that, while the hydrogen-rich treat gas stream 111 is depicted in FIG. 1 as entering the top of the hydrotreatment reactor 110, this is for the sake of simplicity only. In operation, the hydrogen-rich treat gas stream 111 may be introduced into the hydrotreatment reactor 110 at various locations, such as at quench locations corresponding to each reactor bed.

The bio-derived feedstock 105 is then exposed to effective hydrotreatment conditions (such as hydrodeoxygenation conditions) in the hydrotreatment reactor 110 in the presence of one or more catalyst beds that contain a suitable hydrotreating catalyst, resulting in the generation of a hydrotreated effluent 115.

At least a portion of the hydrotreated effluent 115 exiting the hydrotreatment reactor (such as up to substantially all of hydrotreated effluent 115) is then introduced into a separation stage 120. Separation stage 120 allows for separation of the hydrotreated effluent into at least a jet boiling range fraction, one or more lower boiling fractions, and a higher boiling fraction. In the example shown in FIG. 1, separation stage 120 produces a naphtha boiling range fraction 123, a jet boiling range fraction 125, a distillate boiling range fraction 127 (i.e., a higher boiling range fraction than jet boiling range fraction 125), and a light ends fraction. In the example shown in FIG. 1, additional separations (not shown) can be used to recover hydrogen 151 from the light ends fraction. In the configuration shown in FIG. 1, a portion 157 of distillate boiling range fraction 127 is used as a feed for further hydroprocessing. In FIG. 1, separation stage 120 is represented as a fractionation tower. In other aspects, separation stage 120 can correspond to a plurality of gas/liquid separators operating at various combinations of pressure and temperature in order to achieve separation of fractions from the hydrotreated effluent 115. In still other aspects, any convenient combination of flash separators, gas/liquid separators, fractionation towers, and/or other types of separation devices that operate based on boiling point can be used as part of separation stage 120.

As shown in FIG. 1, a portion 157 of the distillate boiling range fraction 127 is used as a feed to hydrocracking reactor 130. The remaining portion 167 of the distillate boiling range fraction 127 is then purged from the system as a renewable diesel product. In some aspects, the purge portion 167 of renewable diesel can be relatively small, but it can be beneficial for removal of components from the system that are not converted to jet boiling range components after multiple passes through the system.

In the configuration shown in FIG. 1, the portion 157 of distillate boiling range fraction 127 is passed into hydrocracking reactor 130, along with hydrogen-rich stream 131, and exposed to hydrocracking conditions to form a hydrocracked effluent 135. Because portion 157 is formed as an output from separation stage 120, the hydrocracking conditions in hydrocracking reactor 130 can correspond to sweet conditions. Additionally, a noble metal hydrocracking catalyst can be used. It will be appreciated by one of skill in the art that, while the hydrogen-rich treat gas stream 131 is depicted in FIG. 1 as entering the top of the hydrocracking reactor 130, this is for the sake of simplicity only. In operation, the hydrogen-rich treat gas stream 131 may be introduced into hydrocracking reactor 130 at various locations, such as at the quench locations corresponding to each reactor bed. In the configuration shown in FIG. 1, hydrogen-rich treat gas stream 131 is composed of make-up hydrogen. In other aspects, a portion of the hydrogen in hydrogen-rich treat gas stream 131 can correspond to recycled hydrogen.

At least a portion of the hydrocracked effluent 135 (such as up to substantially all of hydrocracked effluent 135) is then cascaded into dewaxing reactor 140. In the configuration shown in FIG. 1, the dewaxing reactor 140 can also be operated under sweet conditions, including using a noble metal dewaxing catalyst. Exposing hydrocracked effluent 135 to dewaxing conditions results in formation of a dewaxed effluent 145. At least a portion of the dewaxed effluent 145 (such as up to substantially all of dewaxed effluent 145) can then be passed into hydrotreatment reactor 110 as a co-feed for renewable feedstock 105. In the configuration shown in FIG. 1, no additional hydrogen is passed into dewaxing reactor 140. In other configurations, make-up hydrogen and/or recycled hydrogen can be added to dewaxing reactor 140.

Figure 2:
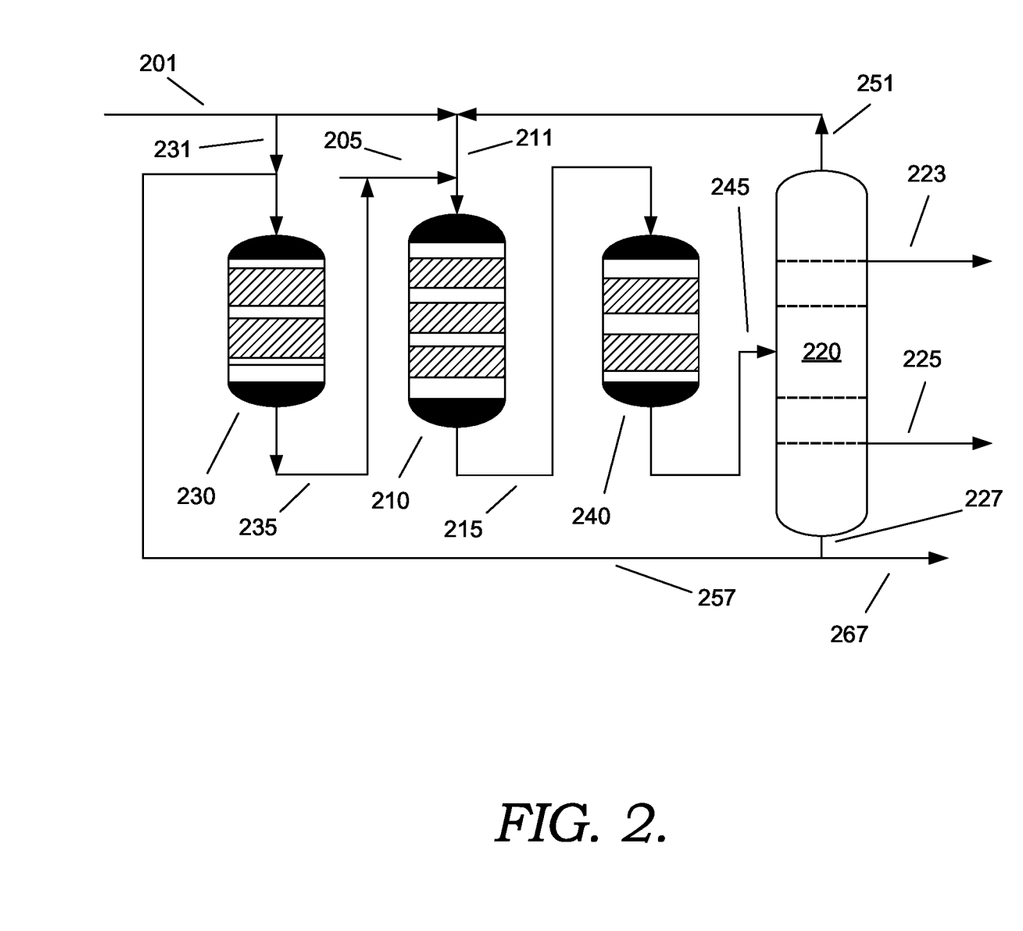
FIG. 2 shows an example of another reaction system for producing a renewable jet boiling range fraction.

FIG. 2 shows another example of a reaction system configuration. As shown in FIG. 2, a bio-derived feedstock 205 is introduced into a hydrotreatment reactor 210. A hydrogen-rich treat gas stream 211 is also introduced into the hydrotreatment reactor 210. In the example shown in FIG. 2, hydrogen-rich treat gas stream 211 corresponds to a combination of recycled hydrogen 251 and make-up hydrogen 201. In other aspects, fresh or make-up hydrogen can be used to supply all of hydrogen-rich treat gas stream 211, or recycled hydrogen can be used to supply all of the hydrogen-rich treat gas stream. It will be appreciated by one of skill in the art that, while the hydrogen-rich treat gas stream 211 is depicted in FIG. 2 as entering the top of the hydrotreatment reactor 110, this is for the sake of simplicity only. In operation, the hydrogen-rich treat gas stream 211 may be introduced into the hydrotreatment reactor 210 at various locations, such as at quench locations corresponding to each reactor bed.

The bio-derived feedstock 205 is then exposed to effective hydrotreatment conditions (such as hydrodeoxygenation conditions) in the hydrotreatment reactor 210 in the presence of one or more catalyst beds that contain a suitable hydrotreating catalyst, resulting in the generation of a hydrotreated effluent 215.

At least a portion of the hydrotreated effluent 215 (such as up to substantially all of hydrotreated effluent 215) is then cascaded into dewaxing reactor 240. Because hydrotreated effluent 215 is passed into dewaxing reactor 240 without prior separation, dewaxing reactor 240 is operated as a "sour" stage. For example, a non-noble metal dewaxing catalyst can be used in dewaxing reactor 240. The hydrotreated effluent 215 is exposed to dewaxing conditions to form a dewaxed effluent 245. In the configuration shown in FIG. 2, no additional hydrogen is passed into dewaxing reactor 240. In other configurations, make-up hydrogen and/or recycled hydrogen can be added to dewaxing reactor 240.

At least a portion of the dewaxed effluent 245 exiting the dewaxing reactor (such as up to substantially all of dewaxed effluent 245) is then introduced into a separation stage 220. Separation stage 220 allows for separation of the hydrotreated effluent into at least a jet boiling range fraction, one or more lower boiling fractions, and a higher boiling fraction. In the example shown in FIG. 2, separation stage 220 produces a naphtha boiling range fraction 223, a jet boiling range fraction 225, a distillate boiling range fraction 227 (i.e., a higher boiling range fraction than jet boiling range fraction 225), and a light ends fraction. In the example shown in FIG. 2, additional separations (not shown) can be used to recover hydrogen 251 from the light ends fraction. In the configuration shown in FIG. 2, a portion 257 of distillate boiling range fraction 227 is used as a feed for further hydroprocessing. In FIG. 2, separation stage 220 is represented as a fractionation tower. In other aspects, separation stage 220 can correspond to a plurality of gas/liquid separators operating at various combinations of pressure and temperature in order to achieve separation of fractions from the dewaxed effluent 245. In still other aspects, any convenient combination of flash separators, gas/liquid separators, fractionation towers, and/or other types of separation devices that operate based on boiling point can be used as part of separation stage 220.

As shown in FIG. 2, a portion 257 of the distillate boiling range fraction 227 is used as a feed to hydrocracking reactor 230. The remaining portion 267 of the distillate boiling range fraction 227 is then purged from the system as a renewable diesel product.

In the configuration shown in FIG. 2, the portion 257 of distillate boiling range fraction 227 is passed into hydrocracking reactor 230, along with hydrogen-rich stream 231, and exposed to hydrocracking conditions to form a hydrocracked effluent 235. At least a portion of the hydrocracked effluent 235 (such as up to all of hydrocracked effluent 235) can then be passed into hydrotreatment reactor 210 as a co-feed for renewable feedstock 205. Because portion 257 is formed as an output from separation stage 220, the hydrocracking conditions in hydrocracking reactor 230 can correspond to sweet conditions. Additionally, a noble metal hydrocracking catalyst can be used. It will be appreciated by one of skill in the art that, while the hydrogen-rich treat gas stream 231 is depicted in FIG. 2 as entering the top of the hydrocracking reactor 230, this is for the sake of simplicity only. In operation, the hydrogen-rich treat gas stream 231 may be introduced into hydrocracking reactor 230 at various locations, such as at the quench locations corresponding to each reactor bed. In the configuration shown in FIG. 2, hydrogen-rich treat gas stream 231 is composed of make-up hydrogen. In other aspects, a portion of the hydrogen in hydrogen-rich treat gas stream 231 can correspond to recycled hydrogen.

Feedstock

In various aspects, jet boiling range fractions can be formed from any convenient type of bio-derived feedstock, where the term "bio-derived feedstock" refers to a hydrocarbon feedstock derived from a biological raw material source, such as vegetable, animal, fish, and/or algae. For example, suitable feedstocks include diglycerides, monoglycerides, triglycerides, fatty acid methyl esters (FAME), free fatty acids, and the like, derived from plant oils, animal fats, or algae oils. In some aspects, a feedstock can be pretreated to remove metals, gums, and other contaminants (such as refined, bleached, and deodorized (RBD) grade vegetable oil).

As used herein, the term "vegetable oil" (or "vegetable fat") refers generally to any plant-based material and can include fats/oils derived from plant sources, such as plants of the genus *Jatropha*. Generally, the biological sources used for the bio-derived feedstock can include vegetable oils/fats, animal oils/fats, fish oils, pyrolysis oils, and/or algae lipids/oils, as well as any components of such biological sources. In some embodiments, the biological sources specifically include one or more types of lipid compounds, where the term "lipid compound" generally refers to a biological compound that is insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils, and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used according to embodiments described herein include, but are not limited to, rapeseed (canola) oil, soybean oil, coconut oil, sunflower oil, palm oil, palm kernel oil, peanut oil, linseed oil, tall oil, corn oil, castor oil, *jatropha* oil, jojoba oil, olive oil, flaxseed oil, camelina oil, safflower oil, babassu oil, tallow oil, and rice bran oil. According to embodiments described herein, vegetable oils can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used according to embodiments described herein include, but are not limited to, beef fat (tallow), hog fat (lard), turkey fat, fish fat/oil, and chicken fat. The animal fats can be obtained from any suitable source, including restaurants and meat production facilities. According to embodiments described herein, animal fats can also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on the total weight of the biomass itself. Algal sources for algae oils include, but are not limited to, unicellular and multicellular algae. Examples of such algae include rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui,* and *Chlamydomonas reinhardtii*.

Moreover, according to embodiments described herein, the bio-derived feedstock can include any feedstock that consists primarily of triglycerides and free fatty acids (FFAs). The triglycerides and FFAs typically contain aliphatic hydrocarbon chains in their structure having from 8 to 36 carbons, or preferably from 10 to 26 carbons, or most preferably from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can consist of $C_{10}$ to $C_{26}$ fatty acid constituents, based on the total triglyceride present in the lipid material.

Furthermore, a triglyceride is a molecule having a structure substantially identical to the reaction product of glycerol and three fatty acids. Thus, although a triglyceride is described herein as consisting of fatty acids, it should be understood that the fatty acid component does not necessarily contain a carboxylic acid hydrogen. In one embodiment, a majority of triglycerides present in the biocomponent feed can preferably consist of $C_{12}$ to $C_{18}$ fatty acid constituents, based on the total triglyceride content. Other types of feeds that are derived from biological raw material components can include fatty acid esters, such as fatty acid alkyl esters (e.g., FAME and/or FAEE).

Hydrotreatment for Hydrodeoxygenation

In various aspects, the bio-derived feedstock can be exposed to hydrotreatment conditions for deoxygenation of the feedstock. The hydrotreatment can be performed in any convenient type of hydrotreatment reactor, such as fixed bed or trickle-bed reactor.

A hydrotreatment catalyst can contain at least one of Group VIB and/or Group VIII metals, optionally on a support such as alumina or silica. Examples include, but are not limited to, NiMo, CoMo, and NiW supported catalysts. In some embodiments, NiMo and Mo on alumina are preferred catalysts.

Hydrotreatment conditions can be selected according to the details of each specific implementation. In a preferred embodiment, the hydrotreatment conditions include a total pressure of 200 psig to 2000 psig (~1.4 MPa-g to 14 MPa-g), a weighted average bed temperature (WABT) of 260° C. (i.e., 500° F.) to 400° C. (i.e., 752° F.), a hydrogen-rich treat gas rate of 200 standard cubic feet of gas per barrel of feedstock (scf/bbl) to 10,000 scf/bbl (~34 $Nm^3/m^3$ to 1700 $Nm^3/m^3$), and a liquid hourly space velocity (LHSV) of 0.1 $hr^{-1}$ to 10.0 $hr^{-1}$.

Optionally, a hydrotreatment reactor can be used that operates at a relatively low total pressure values, such as total pressures of 200 psig (1.4 MPag) to 800 psig (5.5 MPag). For example, the pressure in a stage in the hydrotreatment reactor can be at least 200 psig (1.4 MPag), or at least 300 psig (2.1 MPag), or at least 400 psig (2.8 MPag), or at least 450 psig (3.1 MPag). Additionally or alternately, the pressure in a stage in the hydrotreatment reactor can be 800 psig (5.5 MPag) or less, or 700 psig (4.8 MPag) or less, or 600 psig (4.1 MPa) or less.

In some embodiments, the sulfur and nitrogen contents of the feedstock may be advantageously reduced during the hydrotreatment process. For example, in some embodiments, the hydrotreatment process reduces the sulfur content of the feedstock to a suitable level, such as, for example, less than 100 weight parts per million (wppm), less than wppm, less than 30 wppm, less than 25 wppm, less than 20 wppm, less than 15 wppm, or less than 10 wppm, such as down to 0.1 wppm or possibly still lower. With regard to nitrogen, in some embodiments, the hydrotreatment process reduces the nitrogen content of the feedstock to a suitable level, such as, for example, 30 wppm or less, 25 wppm or less, 20 wppm or less, wppm or less, 10 wppm or less, 5 wppm or less, or 3 wppm or less, such as down to 0.1 wppm or possibly still lower.

In various embodiments, the hydrotreatment process is also used to deoxygenate the feedstock. Deoxygenating the feedstock may help to avoid problems with catalyst poisoning or deactivation due to the creation of water ($H_2O$) or carbon oxides (e.g., CO and $CO_2$) during catalytic dewaxing. Accordingly, the hydrotreatment process can be used to remove, for example, at least 90%, at least 95%, at least 98%, at least 99%, at least 99.5%, at least 99.9%, or completely (measurably) all of the oxygen present in the deoxygenated feedstock. Alternatively, the oxygenate level of the feedstock can be reduced to, for example, wt % or less, 0.05 wt % or less, 0.03 wt % or less, 0.02 wt % or less, 0.01 wt % or less, 0.005 wt % or less, 0.003 wt % or less, 0.002 wt % or less, or 0.001 wt % (10 wppm) or less, such as down to having substantially no oxygen content remaining in the deoxygenated feedstock (less than 1.0 wppm).

Separation Stage

In some aspects, a separation stage can be used to separate out impurities from a hydrotreated feedstock prior to passing the hydrotreated feedstock to the hydrocracking reactor(s) and/or catalyst bed(s). In such aspects, the dewaxing reactor(s) and/or catalyst bed(s) are also downstream in the process flow from the hydrocracking reactor, and therefore also gain the benefit of receiving a "sweet" feed. In other aspects a separation stage can be used to separate out impurities from a hydrotreated, dewaxed feedstock prior to passing the hydrotreated, dewaxed feedstock to the hydrocracking reactor(s) and/or catalyst bed(s). In this type of configuration, only the hydrocracking reactor(s) and/or catalyst beds are operated as a "sweet" stage.

In various aspects, the separation stage reduces or minimizes the amount of $H_2O$ and CO that is passed into the hydrocracking reactor(s) and/or catalyst beds by separating the gas and liquid phases within the hydrotreated feedstock. Any convenient combination of separation devices or processes can be used. This can include, but is not limited to use of one or more fractionators or distillation towers; use of one or more gas-liquid separators; and/or use of one or more amine scrubbers, adsorbers/adsorption systems, and/or membrane separators. It is noted that the amine scrubbers, adsorption systems, and/or membrane separators can be beneficial for improving hydrogen purity in recycle gas. Such various types of separation devices or processes can be operated at various combinations of temperature and/or pressure; and/or other separations based on boiling point.

In addition to at least one jet boiling range fraction, the separation stage can produce any convenient number of additional fractions or products. Such additional fractions can include, but are not limited to, one or more naphtha fractions, one or more light ends fractions, and/or one or more distillate fractions.

In some aspects, hydrogen can be recovered from a fraction containing light ends that exits from the separation stage. Such hydrogen can be recycled and combined with the hydrogen-rich treat gas that is fed into the hydrotreatment reactor.

Catalytic Dewaxing

In various aspects, catalytic dewaxing can be performed by exposing a hydrotreated effluent or a hydrotreated, hydrocracked effluent to a catalyst based on a 10-member ring, one-dimensional zeotype framework structure. In this discussion, a zeotype is defined to refer to a crystalline material having a porous framework structure built from tetrahedra atoms connected by bridging oxygen atoms. Examples of known zeotype frameworks are given in the "Atlas of Zeolite Frameworks" published on behalf of the Structure Commission of the International Zeolite Association", 6th revised edition, Ch. Baerlocher, L. B. McCusker, D. H. Olson, eds., Elsevier, New York (2007) and the corresponding web site, http://www.iza-structure.org/databases/. A zeolite refers to a type of zeotype that includes an aluminosilicate having a zeotype framework type, while zeotypes more generally also refer to crystalline structures having zeotype frameworks that may also containing oxides of heteroatoms different from silicon and aluminum. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework. It is noted that under this definition, a zeotype can include materials such as silicoaluminophosphate (SAPO) materials, silicophosphate (SiPO) materials, or aluminophosphate (AlPO) materials. Examples of 10-member ring, one-dimensional zeotypes framework structures include, but are not limited to, ZSM-48, ZSM-23, ZSM-35 (ferrierite), EU-2, EU-11, ZBM-30, Theta one, ZSM-22, SAPO-11, and combinations thereof.

ZSM-48 is an example of a 10-member ring, one-dimensional zeotype of the MRE framework type. ZSM-48 based catalysts have a high selectivity for isomerization of paraffinic feeds relative to cracking. Thus, a ZSM-48 based catalyst can provide substantially complete isomerization of a paraffinic feed (such as a deoxygenated bio-derived feed) while reducing or minimizing cracking of the paraffinic carbon chains. In some aspects, the catalyst can consist essentially of ZSM-48, any optional binder, and a hydrogenation metal, so that less than 1.0 wt % or less of the catalyst (relative to the weight of the catalyst) corresponds to a zeotype structure different from an MRE framework structure, or less than 0.1 wt %, such as down to having substantially no zeotype content different from an MRE framework structure (0.01 wt % or less). In some aspects where a catalyst is based on ZSM-48, the ZSM-48 in the catalyst can have a silica to alumina ratio of 90:1 or less, or 75:1 or less, such as down to 60:1 or possibly still lower.

Optionally but preferably, the dewaxing catalyst can include a binder, such as alumina, titania, silica, silica-alumina, zirconia, or a combination thereof, for example alumina and/or titania or silica and/or zirconia and/or titania. The relative amount of zeotype and binder can be any convenient amount. In some aspects where a binder is present, the catalyst can include 1.0 wt % to 85 wt % of a binder and/or can include 15 wt % to 99 wt % of a zeotype framework structure material.

Depending on the configuration, the catalytic dewaxing conditions can correspond to "sweet" conditions or "sour" conditions. The presence of sweet or sour conditions can be indicated by whether any of the hydrotreated effluent is passed into the dewaxing reactor(s) and/or catalyst bed(s) prior to passing through a separation stage. When catalytic dewaxing is performed under "sour" conditions, one option for improving the activity of the catalyst under sour conditions is to use a catalyst that is bound with a low surface area binder, such as a binder having a binder surface area of 100 $m^2/g$ or less, or 80 $m^2/g$ or less, such as down to 25 $m^2/g$ or possibly still lower. Additionally or alternately, another option for improving the activity of a dewaxing catalyst under sour conditions is to use a catalyst where the hydrogenation metal includes a non-noble metal, such as Ni, Co, Mo, W, or a combination thereof. This is in contrast to conventional sweet dewaxing catalysts which typically include Pt or Pd as the hydrogenation metal.

In addition to a zeotype framework structure material (such as ZSM-48) and optional binder, the dewaxing catalyst can also include at least one metal hydrogenation component selected from Pd, Pt, or a combination thereof. When a metal hydrogenation component is present, the dewaxing catalyst can include 0.1 wt % to 10 wt % of the Pt, Pd, or combination thereof, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %. In some optional aspects where the catalytic dewaxing is performed under sour conditions, the metal hydrogenation component can instead correspond to a non-noble Group 8-10 metal, optionally in combination with a Group 6 metal. For example, the metal hydrogenation component can correspond to NiW or NiMo. Other possible Group 8-10 metals for use in sour service environments include Co and Fe. In aspects where a non-noble Group 8-10 metal is used as the metal hydrogenation component (optionally in combination with a Group 6 metal), the dewaxing catalyst can include 1.0 wt % to 20 wt % of metal hydrogenation component(s).

The isomerization/dewaxing reactor may include any suitable type of reactor arranged in any suitable configuration. For example, in some embodiments, the isomerization/dewaxing reactor is a fixed-bed adiabatic reactor or a trickle-bed reactor that is loaded with one or more beds of a dewaxing catalyst.

The deoxygenated feedstock (or at least a portion thereof, such as the liquid product portion) is exposed to the zeotype-based isomerization/dewaxing catalyst under effective isomerization/dewaxing conditions. In aspects where dewaxing is performed under sweet conditions, effective isomerization/dewaxing conditions include a total pressure of 200 psig (1.4 MPa-g) to 2000 psig (14 MPa-g), a WABT of 260° C. to 400° C., a treat gas rate of 200 scf/bbl to 10,000 scf/bbl (~34 Nm$^3$/m$^3$ to 1700 Nm$^3$/m$^3$), and an LHSV of 1.0 hr$^{-1}$ to 10.0 hr$^{-1}$ (relative to the volume of the dewaxing catalyst). In aspects where dewaxing is performed under sour conditions, effective isomerization/dewaxing conditions include a total pressure of 200 psig (1.4 MPa-g) to 3000 psig (21 MPa-g), a WABT of 300° C. to 420° C., a treat gas rate of 200 scf/bbl to 10,000 scf/bbl (~34 Nm$^3$/m$^3$ to 1700 Nm$^3$/m$^3$), and an LHSV of 0.5 hr$^{-1}$ to 5.0 hr$^{-1}$ (relative to the volume of the dewaxing catalyst).

Hydrocracking

Hydrocracking catalysts typically contain sulfided base metals or Group VIII noble metals like Pt and/or Pd on acidic supports, such as amorphous silica alumina, cracking zeolites such as USY, or acidified alumina. Often these acidic supports are mixed or bound with other metal oxides such as alumina, titania or silica.

Some examples of zeotype framework structures that can be used for hydrocracking include, but are not limited to, framework structures that include a 12-member ring as the largest pore channel in the framework structure. FAU is an example of a framework structure that includes a 12-member ring as the largest pore channel. Other types of framework structures for hydrocracking catalysts can include MFI and BEA.

Optionally but preferably, the hydrocracking catalyst can include a binder, such as alumina, titania, silica, silica-alumina, zirconia, or a combination thereof, for example alumina and/or titania or silica and/or zirconia and/or titania. The relative amount of zeotype and binder can be any convenient amount. In some aspects where a binder is present, the catalyst can include 1.0 wt % to 85 wt % of a binder and/or can include 15 wt % to 99 wt % of a zeotype framework structure material, relative to the total weight of the catalyst (zeotype plus binder plus any hydrogenation metal).

In addition to a zeotype framework structure material and optional binder, the hydrocracking catalyst can also include at least one metal hydrogenation component. In some aspects, the hydrogenation metal can be selected from Pd, Pt, or a combination thereof. In such aspects, the hydrocracking catalyst can include 0.1 wt % to 10 wt % of the Pt, Pd, or combination thereof, relative to a weight of the catalyst, or 0.1 wt % to 5.0 wt %, or 0.5 wt % to 10 wt %, or wt % to 5.0 wt %, or 1.0 wt % to 10 wt %, or 1.0 wt % to 5.0 wt %.

A hydrocracking process can be carried out at temperatures of 200° C. to 450° C., hydrogen partial pressures of from 100 psig to 3000 psig (0.7 MPa to 20.7 MPa), liquid hourly-space velocities of from 0.2 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). Typically, in most cases, the conditions will have temperatures in the range of 250° C. to 400° C., hydrogen partial pressures of from 100 psig to 2000 psig (0.7 MPa-13.9 MPa), liquid hourly space velocities of from 0.3 h$^{-1}$ to 2 h$^{-1}$ and hydrogen treat gas rates of from 90 m$^3$/m$^3$ to 713 m$^3$/m$^3$ (500 SCF/B to 4000 SCF/B).

Properties of Jet Boiling Range Product

The properties of the jet boiling range fraction generated by a single stage process as described herein can vary depending on whether the dewaxing reactor(s) and/or catalyst bed(s) are positioned for sweet operation or sour operation.

In aspects where sweet dewaxing is performed in a single stage configuration, a portion of the jet boiling range product can correspond to n-paraffins that have not been exposed to either dewaxing or hydrocracking conditions. In some aspects, the jet boiling range product can include 10 wt % or more of n-paraffins, or 15 wt % or more, or 20 wt % or more, such as up to 30 wt % or possibly still higher. As a result, in order to satisfy cold flow properties, the jet boiling range product can have a relatively low T90 distillation point and/or final boiling point. In such aspects, the jet boiling range product can have one or more of the following properties. The jet boiling range product can have a T10 distillation point of 170° C. or less, or 160° C. or less, such as down to 135° C. The jet boiling range product can have a T90 distillation point of 230° C. or less, or 220° C. or less, such as down to 190° C. or possibly still lower. Additionally or alternately, the jet boiling range product can have a final boiling point of 250° C. or less, or 240° C. or less, such as down to 215° C. or possibly still lower.

In addition to the above, the jet boiling range product produced from a configuration where sweet dewaxing is performed can have one or more of the following properties. The jet boiling range product can have a density at 15° C. of 730 kg/m$^3$ or more, or 740 kg/m$^3$ or more, such as up to 772 kg/m$^3$ or possibly still higher. The jet boiling range product can have a freeze point of −40° C. or lower, or −47° C. or lower, or −50° C. or lower, such as down to −100° C. or possibly still lower. The jet boiling range product can have a flash point of 38° C. or higher, or 40° C. or higher, or 45° C. or higher, such as up to 80° C. or possibly still higher. The yield of the jet boiling range product can be 25 wt % or more relative to the weight of fresh feed, or 30 wt % or more, such as up to 45 wt % or possibly still higher.

In other aspects where sour dewaxing is performed in a single stage configuration, all of the resulting jet boiling range product is exposed at least once to the dewaxing reactor(s) and/or catalyst bed(s). This can reduce or minimize the quantity of n-paraffins that are present in the jet boiling range product, thus allowing for a higher cut point between the jet fraction and the diesel fraction. In some aspects, the jet boiling range product can include 5.0 wt % or more of n-paraffins, or 10 wt % or more, such as up to 20 wt % or possibly still higher. In such aspects, the jet boiling range product can have one or more of the following properties. The jet boiling range product can have a T10 distillation point of 205° C. or less, or 190° C. or less, such as down to 135° C. The jet boiling range product can have a T90 distillation point of 270° C. or less, or 260° C. or less, such as down to 220° C. or possibly still lower.

In addition to the above, the jet boiling range product produced from a configuration where sweet dewaxing is performed can have one or more of the following properties. The jet boiling range product can have a density at 15° C. of 730 kg/m$^3$ to 750 kg/m$^3$, or 730 kg/m$^3$ to 760 kg/m$^3$, or 730 kg/m$^3$ to 772 kg/m$^3$, or 740 kg/m$^3$ to 760 kg/m$^3$, or 740 kg/m$^3$ to 772 kg/m$^3$. The jet boiling range product can have a freeze point of −40° C. or lower, or −47° C. or lower, or −50° C. or lower, such as down to −100° C. or possibly still lower. The jet boiling range product can have a flash point of 38° C. or higher, or 40° C. or higher, or 45° C. or higher, such as up to 80° C. or possibly still higher. The yield of the jet boiling range product can be 30 wt % or more relative to the weight of fresh feed, or 35 wt % or more, or 40 wt % or more, such as up to 50 wt % or possibly still higher.

In addition to the above, in some aspects, a jet boiling range fraction generated from either a sweet dewaxing or sour dewaxing configuration can satisfy one or more of the following specifications from ASTM D7566 (Annex 2). Examples of property specifications and/or typical properties include a total acidity of 0.015 mg KOH/g or less, a sulfur content of 15 wppm or less, a flash point of 38° C. or higher, a T10 distillation point of 205° C. or less, and/or a final boiling point of 300° C. or less. Another example of a property specification is a specification for a maximum pressure increase during a thermal stability test at 325° C. (according to ASTM D3241), such as a maximum pressure increase of 25 mm Hg.

It is noted that due to the bio-derived nature of the jet boiling range fraction, the sulfur content of the jet boiling range can be relatively low, such as being substantially free of sulfur. Thus, in some aspects, the sulfur content of the jet boiling range fraction can be 100 wppm or less, or 10 wppm or less, such as down to having substantially no sulfur content (0.1 wppm or less). Similarly, due to the hydrodeoxygenation and dewaxing steps, the oxygen content of the jet boiling range fraction can be relatively low, such as substantially free of oxygen. Thus, in some aspects, the oxygen content of the jet boiling range fraction can be 100 wppm or less, or 10 wppm or less, or 5.0 wppm or less, or 1.0 wppm or less, such as down to having substantially no oxygen content (0.1 wppm or less).

Example

A pilot-scale configuration similar to FIG. 1 (a sweet dewaxing configuration) was used to form a jet boiling range fraction from a bio-derived feedstock. The feedstock corresponded to a soybean oil. The hydrocracking catalyst corresponded to Pt supported on alumina-bound USY. The dewaxing catalyst corresponded to Pt on alumina-bound ZSM-48. Conventional hydrodeoxygenation catalysts were used for HDO stage. Table 1 shows the test conditions and yields.

TABLE 1

| Conditions for Processing | | | | |
|---|---|---|---|---|
| Catalyst | | Hydrocracking | MIDW | Hydrotreating |
| Pressure | MPa-g | 6.9 | 6.9 | 6.9 |
| LHSV | 1/h | 2 | 4 | 1 |
| Temperature | ° C. | 316 | 316 | 327 |
| TGR | Nm$^3$/m$^3$ | 340 | 340 | 1360 |
| Yield | | | | |
| C1-C4 | wt % | | | 11 |
| Naphtha, C5-250° F. | wt % | | | 39 |
| Jet, 250-500° F. | wt % | | | 34 |
| Diesel, 500+ ° F. | wt % | | | 18 |

As shown in Table 1, the yield of the jet fraction was 34 wt %, while light ends corresponded to 11 wt % and naphtha corresponded to 39 wt %. Table 2 shows additional properties of renewable jet boiling range fraction in comparison with the ASTM D7566 specification.

TABLE 2

| Properties of Jet Boiling Range Fraction | | |
|---|---|---|
| | ASTM D7566 Specification | Renewable Jet Sample |
| Density at 15° C., kg/m$^3$, min-max | 730-772 | 740 |
| Distillation | | |
| T10, ° C., max | 205 | 141 |
| T50, ° C. | Report | 167 |
| T90, ° C. | Report | 207 |
| FBP, ° C. | 300 | 230 |
| Freezing point, ° C., max | −40 | −52 |

As shown in Table 2, the freezing point was −52° C., which is below the specification of <−40° C. This was achieved in part by limiting the T90 distillation point of the jet boiling range fraction to 207° C. and/or by limiting the final boiling point to 230° C. Due to the lower boiling range, the density was also relatively low, at 740 kg/m$^3$.

Additional Embodiments

Embodiment 1. A method for producing a renewable jet boiling range fraction, comprising: contacting a bio-derived feedstock and a hydrocracked, dewaxed co-feed with a hydrotreatment catalyst under effective hydrotreatment conditions to produce a deoxygenated effluent comprising a deoxygenated liquid fraction; separating the deoxygenated liquid fraction to form at least i) a jet boiling range fraction having a T90 distillation point of 230° C. or lower and a freeze point of −40° C. or lower and ii) a second fraction having a final boiling point of 300° C. or higher; contacting at least a portion of the second fraction with a hydrocracking catalyst under hydrocracking conditions to produce a hydrocracked effluent; and cascading at least a portion of the hydrocracked effluent into a reactor containing a dewaxing catalyst under dewaxing conditions to produce an effluent comprising the hydrocracked, dewaxed co-feed.

Embodiment 2. The method of Embodiment 1, wherein a yield of the jet boiling range fraction is 25 wt % to 45 wt % relative to a weight of the bio-derived feedstock.

Embodiment 3. The method of Embodiment 1 or 2, wherein the jet boiling range fraction comprises 10 wt % or more of n-paraffins, relative to a weight of the jet boiling range fraction.

Embodiment 4. The method of any of Embodiments 1 to 3, the method further comprising: separating at least a portion of the deoxygenated effluent to form a fraction comprising hydrogen and the deoxygenated liquid fraction; and separating at least a portion of the fraction comprising hydrogen to form a recycle fraction containing hydrogen, wherein contacting the bio-derived feedstock and the hydrocracked, dewaxed co-feed with a hydrotreatment catalyst under effective hydrotreatment conditions contacting the bio-derived feedstock and the hydrocracked, dewaxed co-feed in the presence of at least a portion of the recycle fraction.

Embodiment 5. A method for producing a renewable jet boiling range fraction, comprising: contacting a bio-derived feedstock and a hydrocracked co-feed with a hydrotreatment catalyst under effective hydrotreatment conditions to produce a deoxygenated effluent comprising a deoxygenated liquid fraction; cascading at least a portion of the deoxygenated liquid fraction into a reactor containing a dewaxing catalyst under dewaxing conditions to produce a dewaxed effluent; separating the dewaxed effluent to form at least i) a jet boiling range fraction having a T90 distillation point of 260° C. or lower and a freeze point of −40° C. or lower and ii) a second fraction having a final boiling point of 300° C. or higher; and contacting at least a portion of the second fraction with a hydrocracking catalyst under hydrocracking conditions to produce a hydrocracked effluent comprising the hydrocracked co-feed.

Embodiment 6. The method of Embodiment 5, wherein the deoxygenated effluent comprises 0.5 wt % or more of $H_2O$.

Embodiment 7. The method of Embodiment 5 or 6, wherein a yield of the jet boiling range fraction is 35 wt % or more relative to a weight of the bio-derived feedstock.

Embodiment 8. The method of any of Embodiments 5 to 7, wherein the dewaxing catalyst comprises a binder having a binder surface area of 100 $m^2/g$ or less, or wherein the dewaxing catalyst comprises a non-noble hydrogenation metal, or a combination thereof.

Embodiment 9. The method of any of Embodiments 5 to 8, wherein the jet boiling range fraction comprises 5.0 wt % or more of n-paraffins, relative to a weight of the jet boiling range fraction.

Embodiment 10. The method of any of Embodiments 5 to 9, wherein separating the dewaxed effluent further comprises forming a recycle fraction containing hydrogen, and wherein contacting the bio-derived feedstock and the hydrocracked co-feed with a hydrotreatment catalyst under effective hydrotreatment conditions contacting the bio-derived feedstock and the hydrocracked co-feed in the presence of at least a portion of the recycle fraction.

Embodiment 11. The method of any of the above embodiments, wherein the jet boiling range fraction comprises a flash point of 38° C. or higher, or wherein the jet boiling range fraction comprises 1.0 wppm or less of oxygen, or a combination thereof.

Embodiment 12. A system for producing a renewable jet boiling range fraction, comprising: a hydrotreatment reactor comprising at least one hydrotreatment feed inlet, at least one treat gas inlet, and a deoxygenated effluent outlet, the hydrotreatment reactor comprising one or more beds of hydrotreating catalyst; a dewaxing reactor comprising a dewaxing feed inlet in fluid communication with the hydrodeoxygenated effluent outlet without intermediate separation, a dewaxed effluent outlet, and one or more beds of dewaxing catalyst; a separation stage comprising a separation inlet in fluid communication with the dewaxed effluent outlet, a gas product outlet, and a plurality of liquid product outlets, the plurality of liquid product outlets comprising at least a jet boiling range fraction outlet; and a hydrocracking reactor comprising a hydrocracking feed inlet, a hydrocracked effluent outlet in fluid communication with the at least one hydrotreatment feed inlet, and one or more beds of hydrocracking catalyst, the hydrocracking feed inlet being in fluid communication with one or more outlets of the plurality of liquid product outlets that are different from the jet boiling range fraction outlet.

Embodiment 13. The system of Embodiment 12, wherein the dewaxing catalyst comprises a binder having a binder surface area of 100 $m^2/g$ or less, or wherein the dewaxing catalyst comprises a non-noble hydrogenation metal, or a combination thereof.

Embodiment 14. The system of Embodiment 12 or 13, wherein the hydrocracking reactor further comprises a hydrocracking treat gas inlet in fluid communication with the gas product outlet.

Embodiment 15. The method of any of Embodiments 1 to 11 or the system of any of Embodiments 12 to 14, wherein the hydrocracking catalyst comprises a zeotype framework structure having a largest pore channel comprising a 12-member ring and wherein the dewaxing catalyst comprises a zeotype framework structure having a largest pore channel comprising a 10-member ring.

Additional Embodiment A. A system for producing a renewable jet boiling range fraction, comprising: a hydrotreatment reactor comprising at least one hydrotreatment feed inlet, at least one treat gas inlet, and a deoxygenated effluent outlet, the hydrotreatment reactor comprising one or more beds of hydrotreating catalyst; a separation stage comprising a separation inlet in fluid communication with the deoxygenated effluent outlet, a gas product outlet, and a plurality of liquid product outlets, the plurality of liquid product outlets comprising at least a jet boiling range fraction outlet; a hydrocracking reactor comprising a hydrocracking feed inlet, a hydrocracked effluent outlet, and one or more beds of hydrocracking catalyst, the hydrocracking feed inlet being in fluid communication with one or more outlets of the plurality of liquid product outlets that are different from the jet boiling range fraction outlet; and a dewaxing reactor comprising a dewaxing feed inlet in fluid communication with the hydrocracked effluent outlet without intermediate separation, a dewaxed effluent outlet in fluid communication with the at least one hydrotreatment feed inlet, and one or more beds of dewaxing catalyst.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing a renewable jet boiling range fraction, comprising: contacting a bio-derived feedstock and a hydrocracked, dewaxed co-feed with a hydrotreatment catalyst under effective hydrotreatment conditions to produce a deoxygenated effluent comprising a deoxygenated liquid fraction; separating the deoxygenated liquid fraction to form at least i) a jet boiling range fraction having a T90 distillation point of 230° C. or lower and a freeze point of −40° C. or lower and ii) a second fraction having a final boiling point of 300° C. or higher; contacting at least a portion of the second fraction with a hydrocracking catalyst under hydrocracking conditions to produce a hydrocracked effluent; and cascading at least a portion of the hydrocracked effluent into a reactor containing a dewaxing catalyst under dewaxing conditions to produce an effluent comprising a portion of the hydrocracked, dewaxed co-feed.

2. The method of claim 1, wherein the jet boiling range fraction comprises a flash point of 38° C. or higher.

3. The method of claim 1, wherein the jet boiling range fraction comprises 1.0 wppm or less of oxygen.

4. The method of claim 1, wherein a yield of the jet boiling range fraction is 25 wt % to 45 wt % relative to a weight of the bio-derived feedstock.

5. The method of claim 1, wherein the hydrocracking catalyst comprises a zeotype framework structure having a largest pore channel comprising a 12-member ring and wherein the dewaxing catalyst comprises a zeotype framework structure having a largest pore channel comprising a 10-member ring.

6. The method of claim 1, wherein the jet boiling range fraction comprises 10 wt % or more of n-paraffins, relative to a weight of the jet boiling range fraction.

7. The method of claim 1, the method further comprising: separating at least a portion of the deoxygenated effluent to form a fraction comprising hydrogen and the deoxygenated liquid fraction; and separating at least a portion of the fraction comprising hydrogen to form a recycle fraction containing hydrogen, wherein contacting the bio-derived feedstock and the hydrocracked, dewaxed co-feed with a hydrotreatment catalyst under effective hydrotreatment conditions contacting the bio-derived feedstock and the hydrocracked, dewaxed co-feed in the presence of at least a portion of the recycle fraction.

8. A method for producing a renewable jet boiling range fraction, comprising: contacting a bio-derived feedstock and a hydrocracked, dewaxed co-feed with a hydrotreatment catalyst under effective hydrotreatment conditions to produce a deoxygenated effluent comprising a deoxygenated liquid fraction; separating, in a separation stage, the deoxygenated liquid fraction to form at least i) a jet boiling range fraction having a T90 distillation point of 230° C. or lower and a freeze point of −40° C. or lower and ii) a second fraction having a final boiling point of 300° C. or higher; contacting at least a portion of the second fraction with a hydrocracking catalyst under hydrocracking conditions to produce a hydrocracked effluent; and cascading at least a portion of the hydrocracked effluent into a reactor containing a dewaxing catalyst under dewaxing conditions to produce an effluent comprising a portion of the hydrocracked, dewaxed co-feed, wherein the separation stage is the is the only separation stage used to produce the renewable jet boiling range fuel from the bio-derived feedstock.

9. The method of claim 8, wherein the jet boiling range fraction comprises a flash point of 38° C. or higher.

10. The method of claim 8, wherein the jet boiling range fraction comprises 1.0 wppm or less of oxygen.

11. The method of claim 8, wherein a yield of the jet boiling range fraction is 25 wt % to 45 wt % relative to a weight of the bio-derived feedstock.

12. The method of claim 8, wherein the hydrocracking catalyst comprises a zeotype framework structure having a largest pore channel comprising a 12-member ring and wherein the dewaxing catalyst comprises a zeotype framework structure having a largest pore channel comprising a 10-member ring.

13. The method of claim 8, wherein the jet boiling range fraction comprises 10 wt % or more of n-paraffins, relative to a weight of the jet boiling range fraction.

14. The method of claim 8, wherein the dewaxing catalyst comprises a binder having a binder surface area of 100 m$^2$/g or less, or wherein the dewaxing catalyst comprises a non-noble hydrogenation metal, or a combination thereof.

15. A method for producing a renewable jet boiling range fraction, comprising: contacting a bio-derived feedstock and a hydrocracked, dewaxed co-feed with a hydrotreatment catalyst under effective hydrotreatment conditions to produce a deoxygenated effluent comprising a deoxygenated liquid fraction; separating the deoxygenated liquid fraction to form at least i) a jet boiling range fraction having a T90 distillation point of 230° C. or lower and a freeze point of −40° C. or lower and ii) a second fraction having a final boiling point of 300° C. or higher; contacting at least a portion of the second fraction with a hydrocracking catalyst under hydrocracking conditions to produce a hydrocracked effluent; and cascading at least a portion of the hydrocracked effluent into a reactor containing a dewaxing catalyst under dewaxing conditions to produce an effluent comprising a portion of the hydrocracked, dewaxed co-feed, wherein the hydrocracking catalyst comprises a noble hydrogenation metal.

16. The method of claim 15, wherein the deoxygenated effluent comprises 0.5 wt % or more of $H_2O$.

17. The method of claim 15, wherein a yield of the jet boiling range fraction is 35 wt % or more relative to a weight of the bio-derived feedstock.

18. The method of claim 15, wherein the jet boiling range fraction comprises 5.0 wt % or more of n-paraffins, relative to a weight of the jet boiling range fraction.

19. The method of claim 15, the method further comprising: separating at least a portion of the deoxygenated effluent to form a fraction comprising hydrogen and the deoxygenated liquid fraction; and separating at least a portion of the fraction comprising hydrogen to form a recycle fraction containing hydrogen, wherein contacting the bio-derived feedstock and the hydrocracked, dewaxed co-feed with a hydrotreatment catalyst under effective hydrotreatment conditions contacting the bio-derived feedstock and the hydrocracked, dewaxed co-feed in the presence of at least a portion of the recycle fraction.

* * * * *